(12) United States Patent
Rippel

(10) Patent No.: US 7,851,966 B2
(45) Date of Patent: Dec. 14, 2010

(54) STATOR FOR ELECTRIC MACHINE WITH IMPROVED EFFICIENCY AND THERMAL PERFORMANCE

(76) Inventor: Wally E. Rippel, 3308 Alegre La., Altadena, CA (US) 91101

( * ) Notice: Subject to any disclaimer, the term of this patent is extended or adjusted under 35 U.S.C. 154(b) by 308 days.

(21) Appl. No.: 11/972,568

(22) Filed: Jan. 10, 2008

(65) Prior Publication Data
US 2009/0195108 A1   Aug. 6, 2009

(51) Int. Cl.
*H02K 3/14* (2006.01)
(52) U.S. Cl. .................. 310/216.101; 310/216.102; 310/215
(58) Field of Classification Search ............... 310/208, 310/214, 216.024–216.029, 216.031, 216.035, 310/216.079, 216.099, 216.101, 216.102, 310/215
See application file for complete search history.

(56) References Cited

U.S. PATENT DOCUMENTS

| | | | |
|---|---|---|---|
| 2,607,816 A * | 8/1952 | Ryder et al. ......... 310/216.086 |
| 2,711,008 A * | 6/1955 | Smith ...................... 29/596 |
| 2,981,856 A * | 4/1961 | Ludemann et al. .......... 310/256 |
| 3,257,572 A * | 6/1966 | Heilmann et al. ........... 310/190 |
| 4,200,818 A * | 4/1980 | Ruffing et al. ............. 310/214 |
| 4,392,073 A * | 7/1983 | Rosenberry, Jr. ..... 310/216.006 |
| 4,425,521 A * | 1/1984 | Rosenberry et al. ......... 310/214 |
| 4,745,314 A | 5/1988 | Nakano |
| 5,760,516 A * | 6/1998 | Baumann et al. ........... 310/201 |
| 5,889,342 A | 3/1999 | Hasebe et al. |
| 6,121,708 A * | 9/2000 | Muller ...................... 310/214 |
| 6,239,530 B1 * | 5/2001 | Garcia ................ 310/216.109 |
| 6,265,801 B1 * | 7/2001 | Hashiba et al. ............. 310/214 |
| 6,304,018 B1 * | 10/2001 | Ham et al. ............ 310/216.048 |
| 6,611,076 B2 * | 8/2003 | Lindbery et al. ...... 310/216.004 |
| 6,710,479 B2 | 3/2004 | Yoshida et al. |
| 6,724,119 B1 | 4/2004 | Wellisch |
| 6,787,948 B2 * | 9/2004 | Peterson et al. ............... 310/58 |
| 6,903,471 B2 | 6/2005 | Arimitsu et al. |
| 6,954,010 B2 * | 10/2005 | Rippel et al. ............. 310/60 A |
| 7,122,923 B2 | 10/2006 | Lafontaine et al. |

* cited by examiner

*Primary Examiner*—Dang D Le
(74) *Attorney, Agent, or Firm*—Christie, Parker & Hale, LLP

(57) ABSTRACT

A stator for an electric machine, having compacted and bonded windings and a ferromagnetic core including an active element and a cooling element. The compacted and bonded windings are inserted in slots between teeth in the active element, and the cooling element mates with the active element at the tips of the teeth to close the slots over the windings.

10 Claims, 14 Drawing Sheets

STATOR FOR ELECTRIC MACHINE WITH IMPROVED EFFICIENCY AND THERMAL PERFORMANCE

BACKGROUND

Electric machines are electromechanical energy converters that transform electrical energy into mechanical energy, mechanical energy into electrical energy, or both. Electric machines can include motors, generators, alternators, and rotary converters (motor-generators). These machines use a stator (a stationary part), and a rotor (a moving part), separated from one another by an air gap.

Various embodiments of electric machines include axial, rotary, and linear electric machines. In axial and rotary electric machines, the rotor has rotational motion. Rotary electric machines can be found in a "conventional" configuration, where the rotor is internal to the stator, or an "inside out" configuration, where the rotor is external to the stator. In linear electric machines, the moving part is still typically called a "rotor," although the term is not used in its conventional sense as it does not rotate.

In both linear and rotary electric machines, the stator generally comprises a core and windings. A winding consists of coils of insulated wire or, in some cases, heavy, rigid insulated conductors. The winding may be placed around pole pieces, called salient poles, projecting into the air gap from one of the cores, or, with a stator core as shown in FIG. 1, the winding may be embedded in slots 14 cut into the core 12. In a slotted core, the core material remaining between the slots is in the form of teeth 28.

Both stator and rotor generally have a core of ferromagnetic material, such as silicon steel. The core is typically constructed using a bonded stack of thin ferromagnetic laminations that are electrically insulated from one another to impede the flow of eddy currents, which would otherwise greatly reduce the efficiency of the machine.

In all electric machines, electrical losses are an important factor in their design, and improved efficiency is desired. Furthermore, in high-performance systems, where current densities and time derivatives of magnetic flux density are high, heat flux is also high and special cooling means are required to prevent excessive temperatures within both the lamination stack and the winding. Many prior art designs trade off efficiency to improve thermal performance, or vice-versa.

One method used in the prior art to address the special cooling requirements discussed above includes the use of a housing, typically made out of aluminum, press-fitted to the stator core 12 and cooled by either external air flow over peripheral fins, or by the flow of liquid cooling fluid within the housing itself. A more advanced approach in the prior art, illustrated in FIG. 1, includes the use of cooling ports 10 within the stator core 12, allowing cooling fluid to be channeled directly into the core 12. In FIG. 1, the winding, which belongs within the slots 14, is omitted for clarity.

When high-performance cooling methods such as the above are employed, thermal performance is typically limited by the thermal resistance between the winding within the slots 14 and the core 12. Thermal resistance due to dielectric slot liners 18 and voids within the winding becomes the dominant element of the overall thermal impedance. Accordingly, as these components of thermal resistance are reduced, the overall thermal impedance is lowered and power levels can be further increased without incurring excessive temperatures.

Prior attempts to decrease these components of thermal resistance include the use of high thermal conductivity potting material 20 to fill the voids within the winding, as pictured in FIG. 2(a), and the use of large "bus" conductors 30 as the winding, in place of windings formed from multiple wire strands, pictured in FIG. 2(b).

Impregnating the winding as in FIG. 2(a) with a thermally conductive resin or potting material 20 provides a low resistance thermal path between the surface 22 of the individual conductors 24 of the winding and the core slot surfaces 26. While this method can reduce the thermal resistance, its effectiveness is limited by the finite thermal conductivity of available resins and poor resin penetration into the winding.

The use of large "bus" conductors 30 for the winding as in FIG. 2(b) is even more effective, because a greater portion of the slot 14 is filled with the metallic bus conductor 30, as opposed to potting material 20. This results in both reduced thermal resistance and reduced low frequency electrical resistance, both of which can allow increased winding currents without incurring excessive temperatures. Unfortunately, such bus windings 30 have several drawbacks, including increased cost, increased skin and proximity losses, and the requirement of larger slot openings, also resulting in increased electrical losses. Furthermore, because the cross-section of the teeth 28 is trapezoidal in shape to accommodate rectangular bus conductors 30, as opposed to teeth that are rectangular in shape as in FIGS. 1 and 2(a), the magnetic utilization of the teeth 28 is compromised. The net result is that the AC winding resistance is typically degraded, thus offsetting the above benefits.

Further information relevant to attempts to address these problems can be found in U.S. Pat. Nos. 2,711,008 (S. A. Smith); 4,745,314 (Nakano); 5,889,342 (Hasebe et al.); 6,710,479 (Yoshida et al.); 6,724,119 (Wellisch); 6,903,471 (Armitsu et al.); 6,954,010 (Rippel et al.); and 7,122,923 (Lafontaine et al). However, each one of these references suffers from one or more of the following disadvantages: limited thermal performance, increased cost, increased winding electrical resistance, or other increased losses in efficiency.

For the foregoing reasons, there is a need for an electric machine that can inexpensively improve thermal performance and efficiency.

SUMMARY

The present invention is directed to a stator for an electric machine that inexpensively improves the thermal performance and the efficiency of the machine, and a method of manufacturing the same.

A stator having the features of an exemplary embodiment of the present invention includes windings and a ferromagnetic core, the ferromagnetic core having a first element in contact with a second element. The first element has a plurality of slots that, for ease of manufacture, are open for insertion of the windings. The slots in the first element are between a plurality of teeth, the teeth simply being the core material between the slots. To achieve a high packing factor in the windings and low thermal resistance between the winding and the lamination stack, at least a portion of the windings is compacted and bonded such that a cross section of the compacted and bonded portion of the windings generally matches the shape of at least a portion of the slots, and the compacted and bonded winding fits nicely in the slots. With the winding in the slots, the second element of the core is in contact with the first element at a plurality of mating surfaces, with at least a portion of the second element bridging between the teeth of the first element to close the open slots.

In another embodiment, the slots are lined with dielectric (i.e., electrically insulating) liners to insulate the winding from the wall of the core slots. The slot liners may include windows, or openings to allow subsequently added potting material to form low thermal resistance paths between the winding surfaces and the walls of the slots.

In another embodiment, the second element of the stator core comprises at least one fluid channel to further facilitate the removal of heat from the stator. To direct cooling fluid through the fluid channel or channels, manifolds may be added to opposing faces of the second element.

A method having the features of an exemplary embodiment of the present invention comprises placing at least a portion of the windings in slots in a bottom jig. The shape of the slots in the bottom jig generally matches the shape of at least a portion of slots in the first element of the stator, so that the compressed and bonded windings will fit nicely into the core slots. The windings are compressed in the bottom jig using a top jig that mates with the slots in the bottom jig. While compressed in the jig, at least a portion of the windings are bonded together such that at least the portion of the windings in the slots retains the shape of the slots in the bottom jig. At least a portion of the compressed and bonded windings is inserted into the slots in the first element of the stator. The second element of the stator is mated with the first element such that the slots in the first element are closed.

In another embodiment of the method of manufacturing a stator with improved thermal performance, which configures the machine as a rotary electric machine, the step of mating the first element with the second element further comprises creating spiral sections in the first element and in the second element, such that rotating the first element with respect to the second element will force the mating of the first element with the second element at the spiral sections.

DRAWINGS

Embodiments of the invention will be better understood and readily apparent to one of ordinary skill in the art from the following written description, by way of example only, and in conjunction with the drawings, in which:

FIG. 1 is a cross-sectional view of a stator, showing one stator lamination with cooling ports as in prior art U.S. Pat. No. 6,954,010;

DETAILED DESCRIPTION

Several exemplary embodiments of the present invention will now be described with reference to the accompanying drawings. Modifications may be made to the embodiments described below that are still within the scope of the invention.

Figure 1:
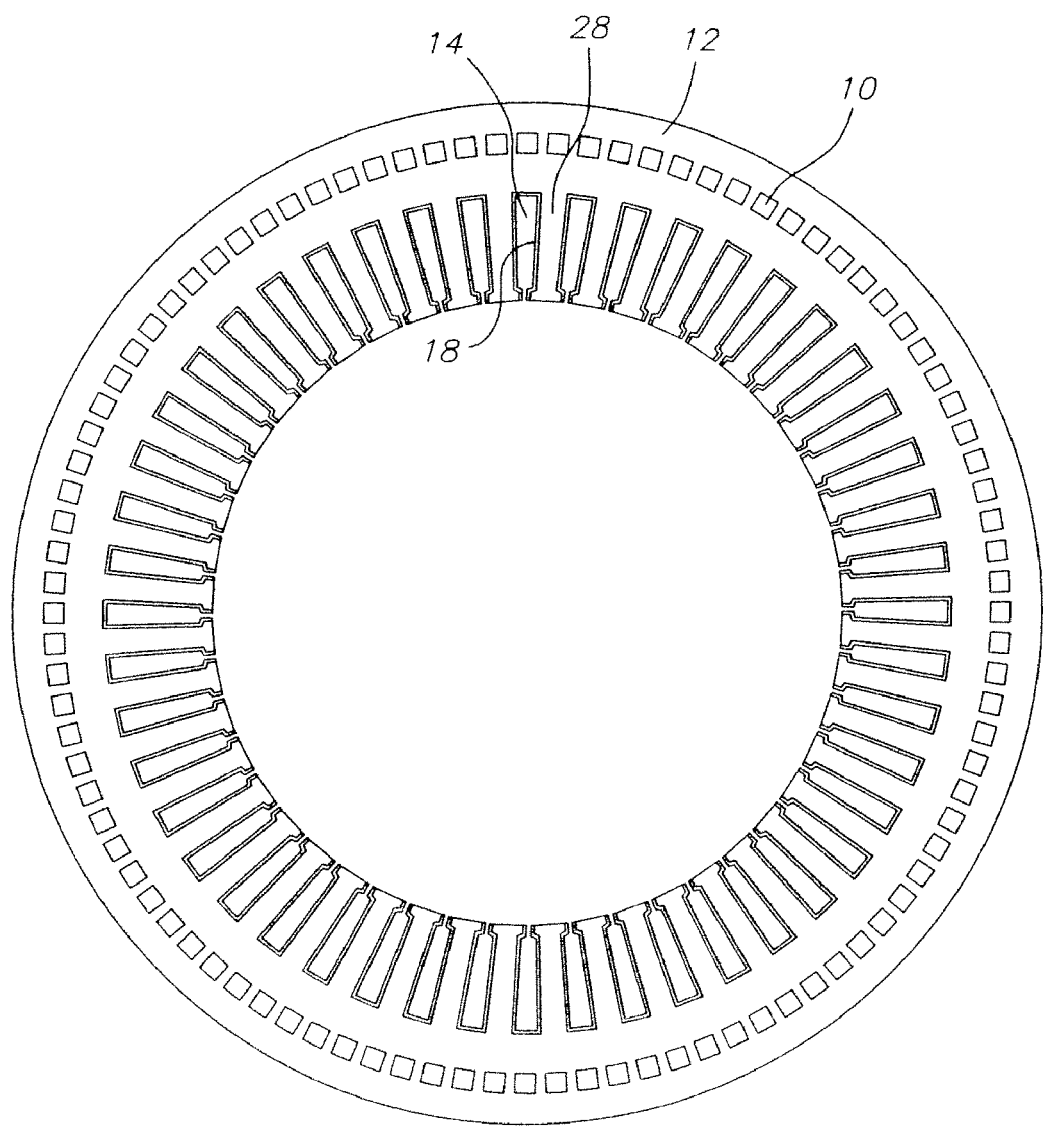
Figure 2A:
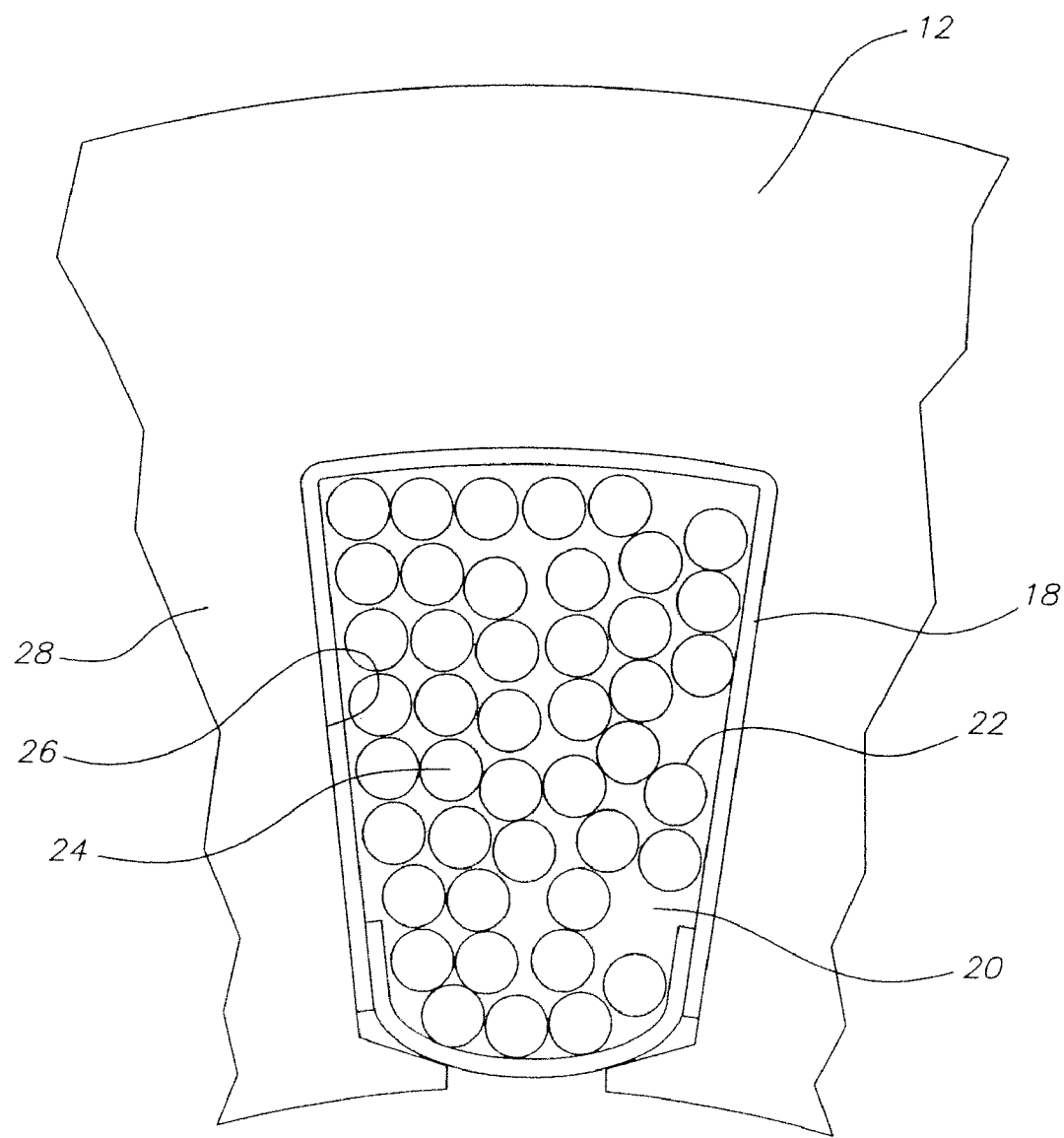
FIG. 2(a) is a cross-sectional view of a stator slot showing a winding impregnated with a high thermal conductivity potting material as in the prior art.
Figure 2B:
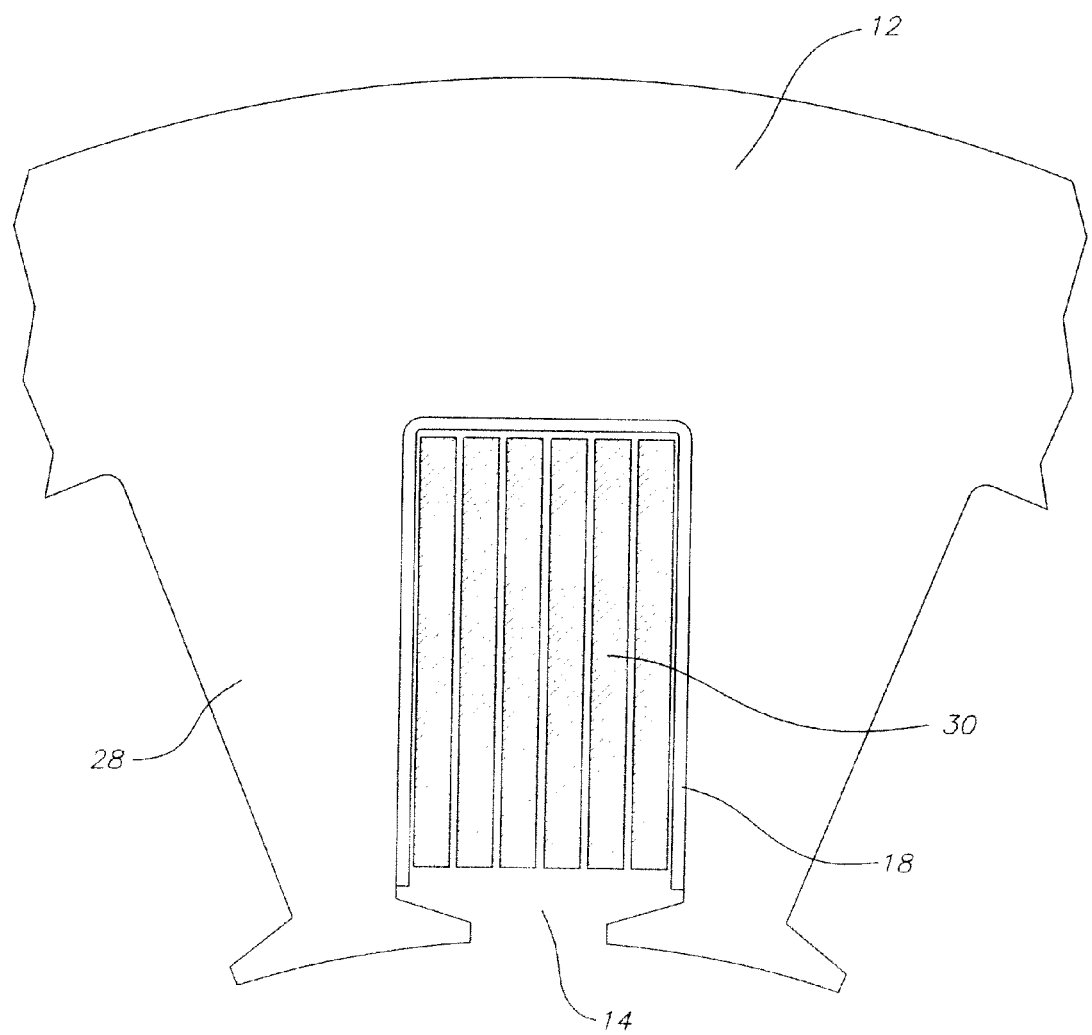
FIG. 2(b) is a cross-sectional view of a stator slot showing a winding made out of a large bus conductor as in the prior art.
Figure 3:
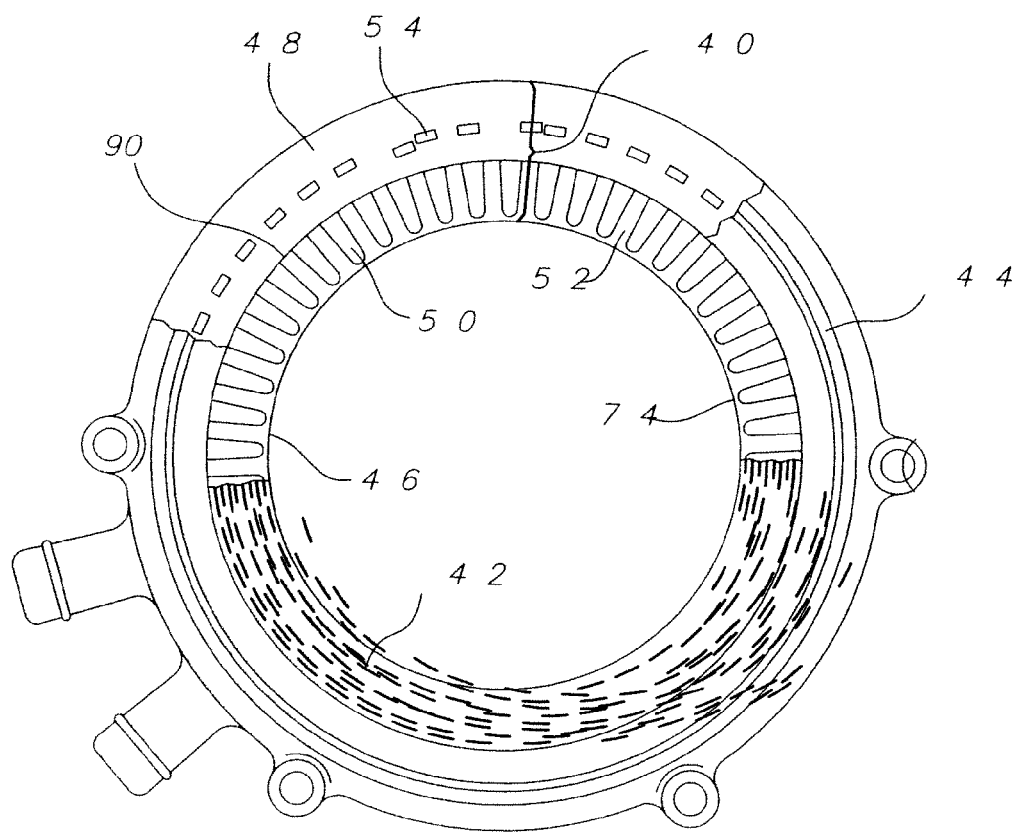
FIG. 3 is an end view with a cutaway view of a stator configured for a conventional rotary electric machine, according to one embodiment of the present invention.
Figure 4:
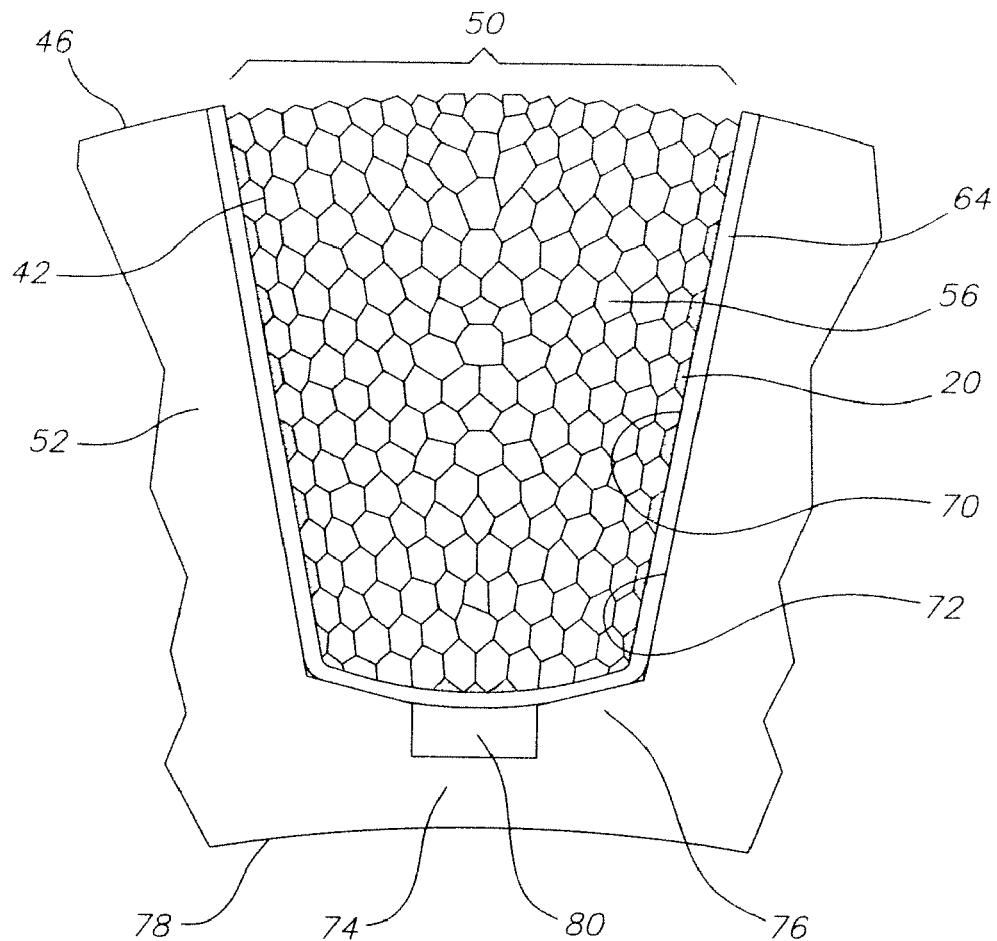
FIG. 4 is a cross-sectional view of a compacted and molded winding inserted into a slot in the active element of the core of a stator configured for a conventional rotary electric machine, according to one embodiment of the present invention.

FIGS. 3-4 show a stator according to one embodiment of the present invention. In this embodiment, the stator is configured for a conventional rotary electric machine wherein a rotor rotates within the stator. The stator comprises a core 40, windings 42, and a manifold 44.

Figure 6:
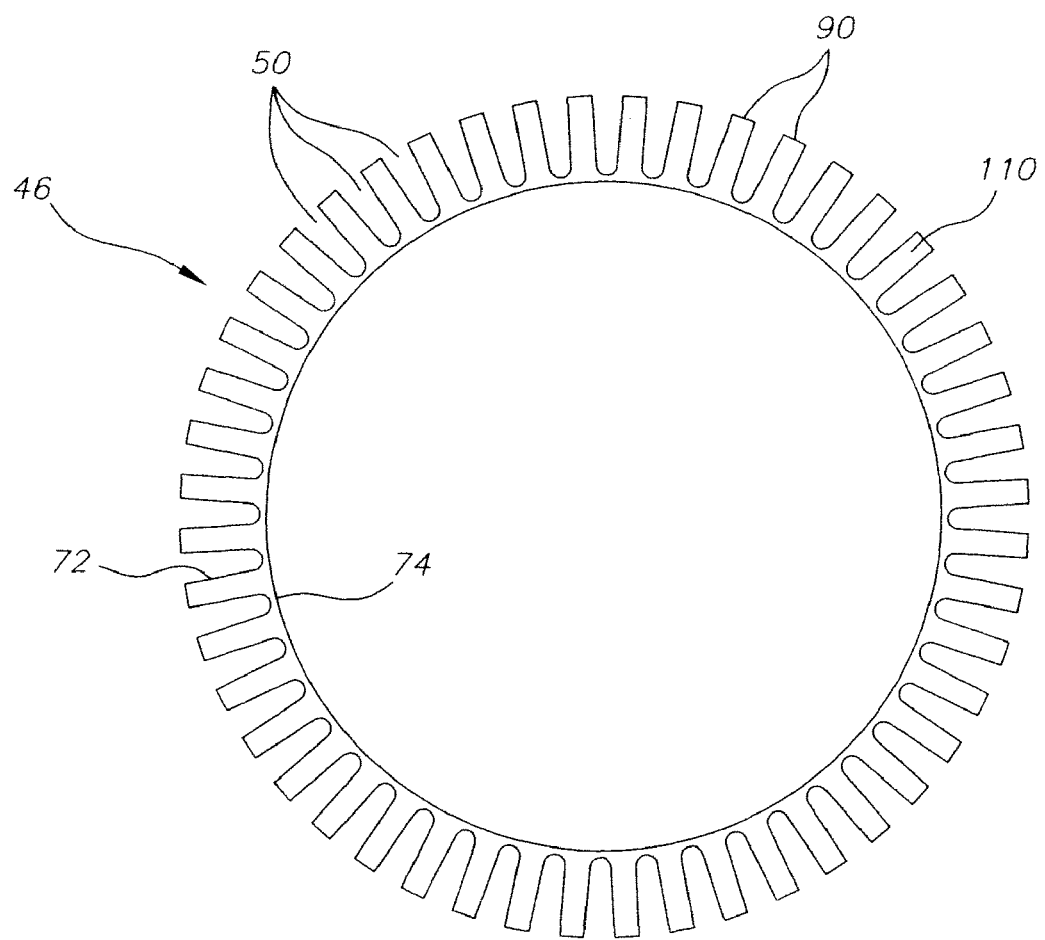
FIG. 6 is an end view of one lamination of the "active element" of a stator core with 48 slots, configured for a conventional rotary motor design, according to one embodiment of the present invention.
Figure 9:
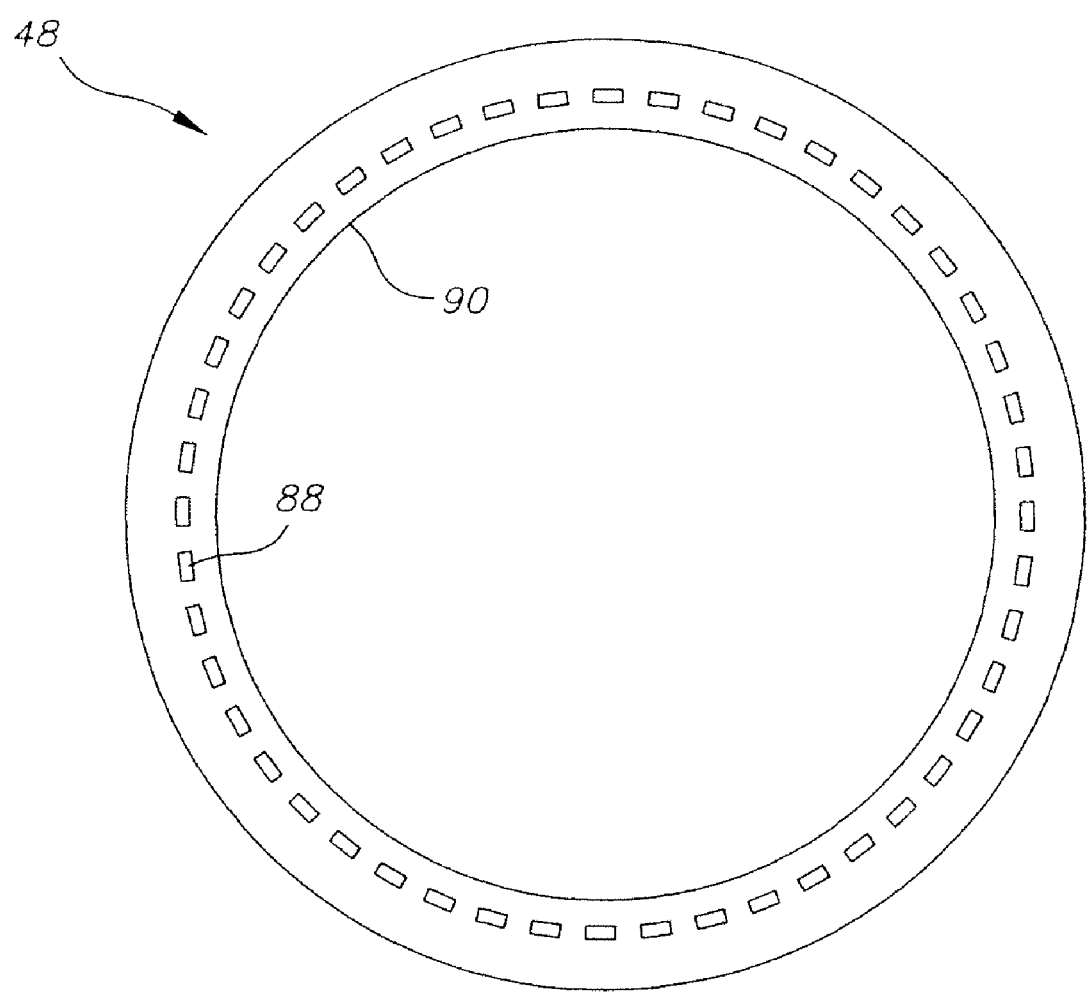
FIG. 9 is an end view of one lamination of the back core of a cooling element of a stator, configured for a 48-slot active element and a conventional rotary electric machine design, according to one embodiment of the present invention.

The core 40 is made of ferromagnetic material, such as silicon steel. The core 40 has two elements, namely, an active element core 46 and a cooling element core 48, each made of a bonded stack of thin ferromagnetic laminations that are electrically insulated from one another. FIGS. 6 and 9 show end views of one lamination of the active element core 46 and cooling element core 48, respectively. The two elements are mated together in forced contact to form the core 40.

The active element core 46 has open slots 50 cut into it for insertion of the windings 42. After insertion of the windings 42 into the slots 50, the end turns of the windings 42 will be wrapped around the material remaining between the slots 50, called the teeth 52, and the cooling element core 48 will then be mated with the active element core 46. Cooling fluid will flow through cooling ports 54 in the cooling element core 48.

FIG. 4 shows a cross sectional view of a winding 42 inserted into a slot 50 in the active element core 46. The windings 42 consist of coils of insulated wire strands 56 that have been compacted and bonded prior to insertion into the slots 50 in the active element core 46. Compaction deforms the individual wire strands 56 such that they pack tightly into roughly hexagonal shapes, while the cross-sectional area of each strand 56 is maintained approximately constant.

Compaction of the stranded wire 56 into a compacted winding 42 achieves a high packing factor compared to conventional multi-strand windings 24, and a large fraction of the slot 50 is occupied by the metallic conductor, which typically has a higher thermal conductivity than potting materials 20. Therefore, thermal resistance between the winding 42 and the active element core 46 is reduced.

Furthermore, the improved packing factor with a compacted winding 42 reduces electrical losses caused by low frequency electrical resistance compared to conventional multi-strand windings 24. Thus, winding currents can be increased without incurring excessive temperatures. A compacted winding 42 also provides for lower electrical losses at moderate to high frequencies compared to conventional bus windings 30, which suffer from eddy and proximity losses at these frequencies.

When polymer insulated, multi-strand conductors like the wires 56 used in the winding 42 are compressed at approximately 30 to 50 kpsi, strand sections deform from circular shapes into approximately hexagonal shapes, as seen in FIG. 4, and can result in packing factors of 95% or higher without incurring strand to strand shorts. Hence, circulating currents between strands of the same conductor can remain negligible. Furthermore, compaction jigs and molds can be employed such that virtually any desired cross sectional shape can be attained for the overall conductor. In particular, cross sections can easily be achieved that accurately match that of the slot 50 in the active element core 46, or some portion thereof.

Figure 5:
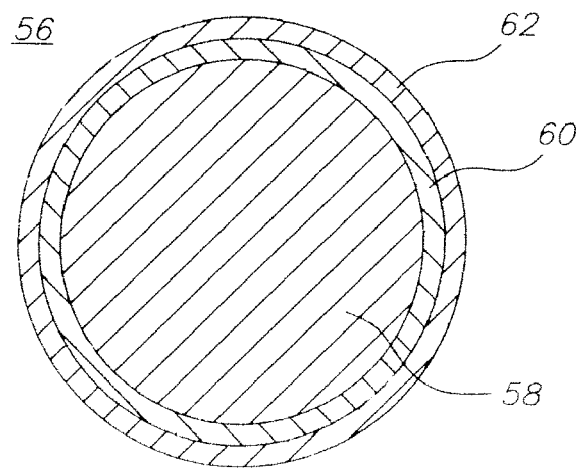
FIG. 5 is a cross-sectional view of one self-bonding magnet wire used in the winding according to one embodiment of the present invention.

In order to maintain the compacted shape after compression forces are removed, the strands 56 are bonded together during compression. FIG. 5 shows one embodiment enabling the required bond, using so-called "self bonding magnet wire." This material starts out as conventional, insulated magnet wire, which includes a copper conductor 58 and an insulating coating 60. A second thin polymer coating 62 is then added, which enables contacting strands 56 to fuse or bond when appropriately heated. An oven may be used to apply the required heat, or a controlled, but relatively high electric current may be applied to the individual conductor strands 56 for a given time duration.

To facilitate the manufacture of the ferromagnetic core 40 comprising the compacted and bonded windings 42, as noted above, a two-element core 40 is used, comprising an active element core 46 and a cooling element core 48. FIG. 6 shows a view of one lamination of the active element core 46. In the pictured embodiment, the active element core 46 has forty-eight slots 50 for the insertion of windings 42, and the stator is configured for a conventional rotary electric machine. The slots 50 in the active element core 46 are fully open to one side, and thereby allow rapid and easy insertion of the compacted and bonded windings 42.

Figure 7:
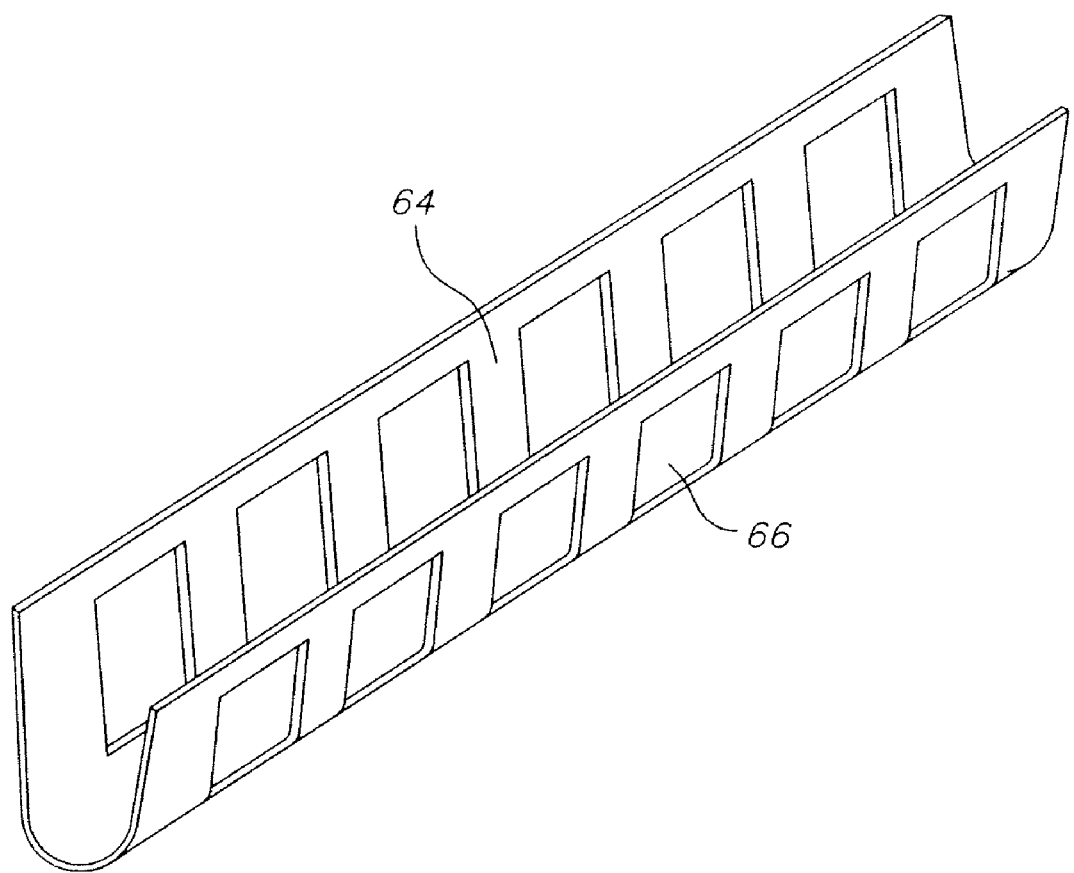
FIG. 7 is a perspective view of a slot liner with "windows" according to one embodiment of the present invention.

Prior to insertion of the windings 42, dielectric slot liners 64 such as the one depicted in FIG. 7 may be installed within each slot 50. However, as is known in the art, these slot liners 64 have limited thermal conductivity and may diminish the transfer of heat from the windings 42 into the core 40. For enhanced heat transfer, windows 66 may be included within the sides of each slot liner. These windows allow higher thermal conductivity potting material 20 to form low thermal resistance paths between the winding surfaces 70 and the slot walls 72. Thus, in the case where high thermal conductivity potting materials 20 are used, large reductions in this component of thermal resistance can be achieved.

It will be noted with reference to FIGS. 3 and 6 that the slots 50 are completely closed at the bridge regions 74, as seen by the air gap between the stator and the rotor (in a conventional rotary electric machine, for which the active element depicted in FIGS. 3-4 and 6 is configured, the rotor will be placed inside the stator). In cases where tooth tip losses and acoustic noise are critical, this design is ideal. However, in cases where the main issue is peak torque (or peak force in a linear motor), slots 50 that are open at the bridge regions 74 are often desired, with slot gaps on the order of four to six times the air gap thickness. As seen in FIG. 4, this new stator structure allows this requirement to be met.

According to this embodiment, laminations for the active element core 46 are initially fabricated with the bridge regions 74 between the tooth tips 76 intact. After final assembly and potting, the bore surface 78 facing the air gap can be machined such that the slot gaps 80 are exposed to the air gap.

Figure 8A:
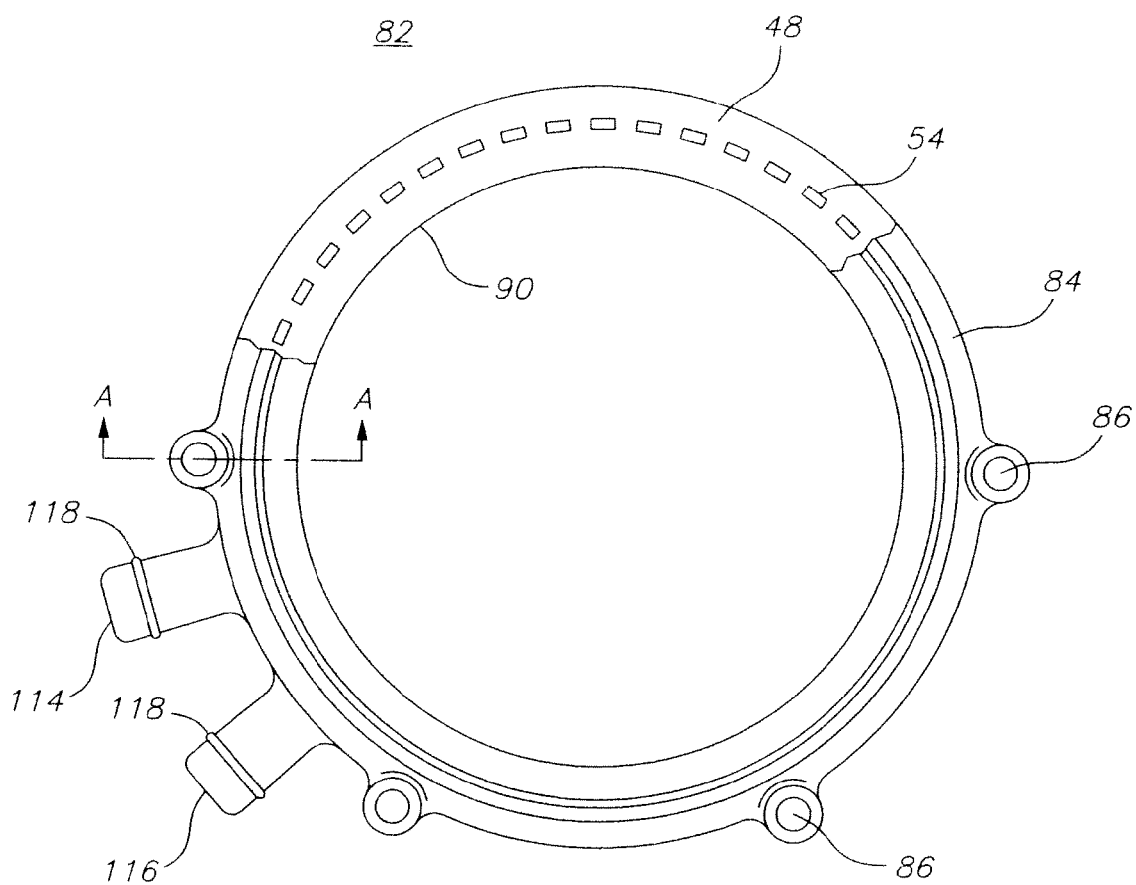
FIG. 8(a) is an end view with a cutaway view of a cooling element of a stator, according to one embodiment of the present invention.

FIG. 8(a) shows one embodiment of the second element of the stator, called the cooling element 82. The cooling element 82 comprises the ferromagnetic cooling element core 48, a front manifold 84 and a rear manifold (not illustrated) that fit over the faces of the cooling element core 48, and tie rods 86 that draw the manifolds toward each other, compressing the cooling element core 48. FIG. 9 shows a view of one lamination of the cooling element core 48. The cooling element 82 can perform both functions of back iron and heat removal via fluid ports 54 formed by the alignment of closed slots 88 in the lamination stack. In the pictured embodiment, the cooling element 82 has forty-eight cooling ports for channeling cooling fluid, and, as above, the stator is configured for a conventional rotary electric machine. Like the active element core 46, the cooling element core 48 is fabricated by stacking and bonding these laminations.

The lamination stacks for both the active element core 46 and the cooling element core 48 are structured from lamination material such as silicon steel. The individual laminations may be bonded together using a low-viscosity, thermally activated resin. The active element core 46 and the cooling element core 48 mate in forced contact to form the complete stator core 40.

Figure 10:
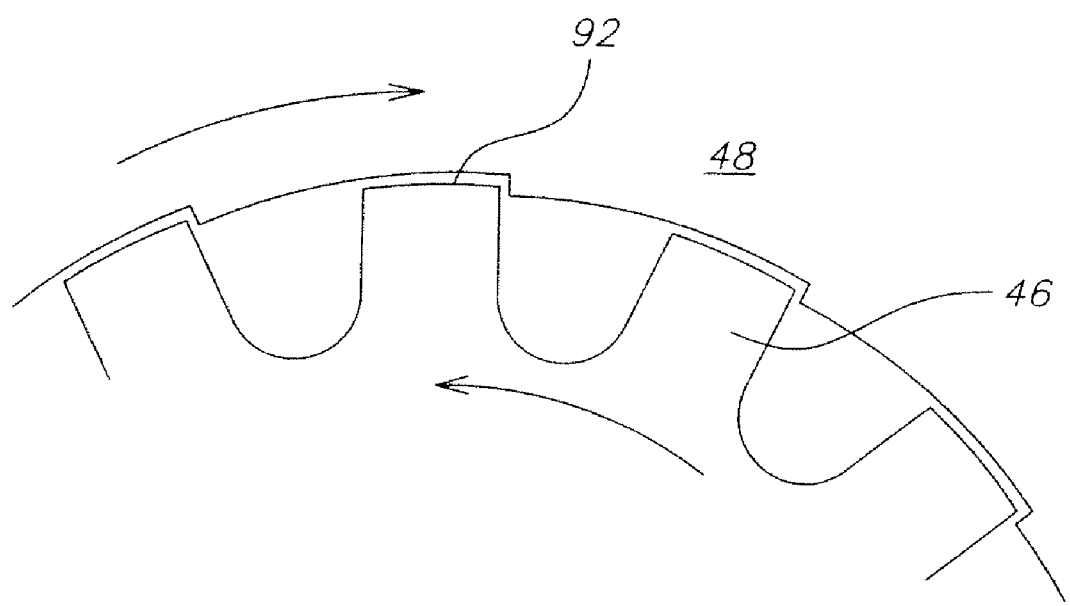
FIG. 10 is a detail view of how the teeth in the active element and sections of the cooling element can be spiral sections, enabling forced contact between the two core elements through mutual rotation of the active and cooling elements, according to one embodiment of the present invention.

In a rotary electric machine configuration according to one embodiment of the present invention, as in FIGS. 3, 4, 6, 8, and 9, the active element core 46 and the cooling element core 48 are both annular in shape. Respective contacting surfaces 90 of the two elements can be circular sections, as in FIG. 3, such that the forced contact is achieved by inserting the internal element after thermally expanding the external element. Alternatively, as depicted in FIG. 10, the contacting surfaces can be spiral sections 92 such that the forced contact is achieved by rotational motion, thus simplifying the forced contact. The active element core 46 can be inside the cooling element core 48, as in FIGS. 3 and 10, or the active element core 46 can be outside the cooling element core 48. In either case, the two elements are in structural and thermal contact with one another to facilitate the transfer of thermal energy from the active element core 46 to the cooling element core 48.

Figure 11:
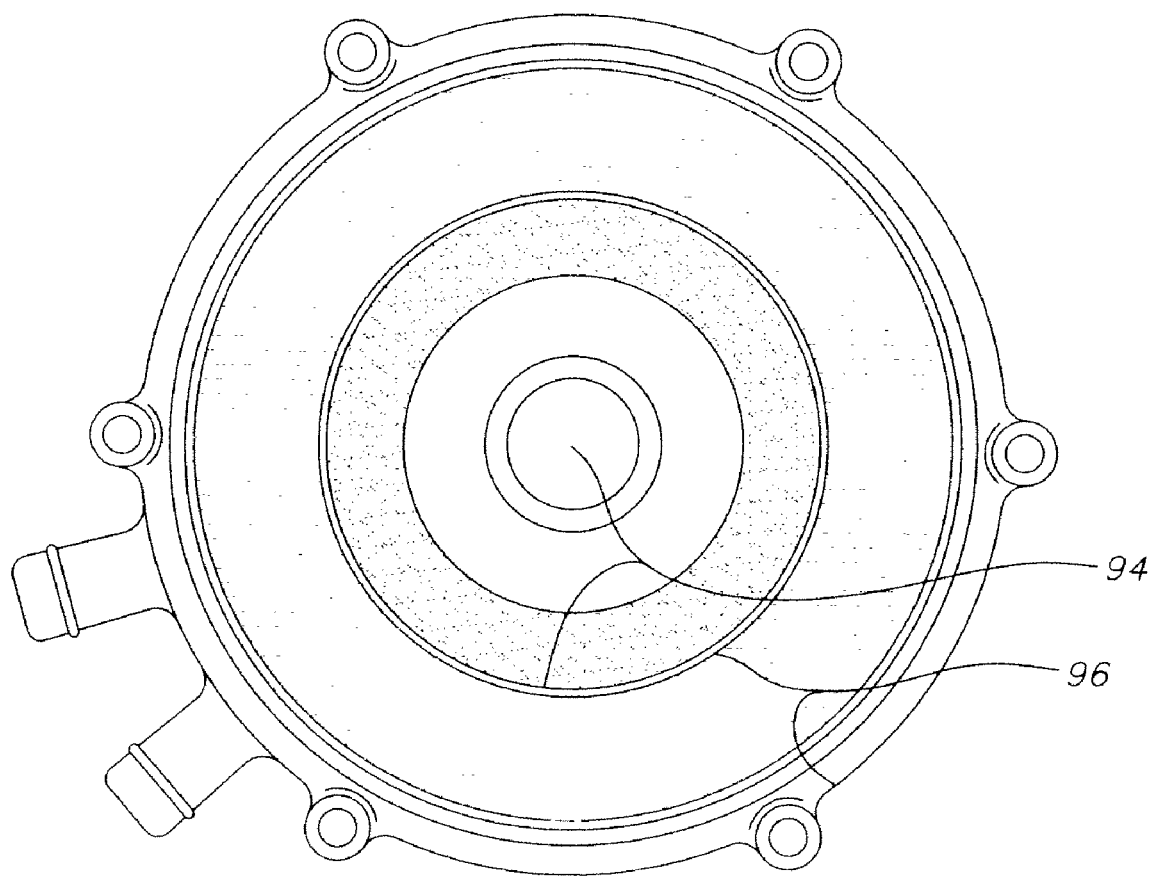
FIG. 11 is a cross-sectional view of a conventional rotary induction machine according to one embodiment of the present invention.
Figure 12:
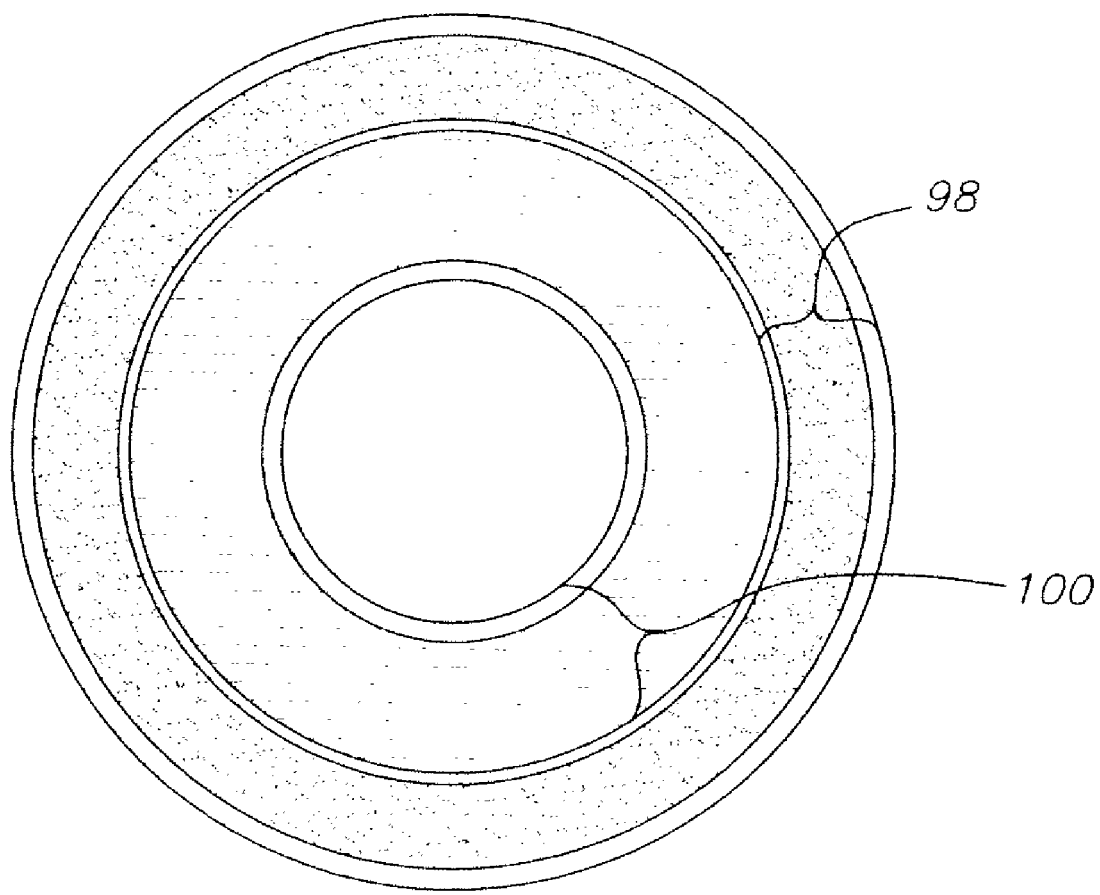
FIG. 12 is a cross-sectional view of an "inside-out" rotary induction machine according to one embodiment of the present invention.
Figure 13:
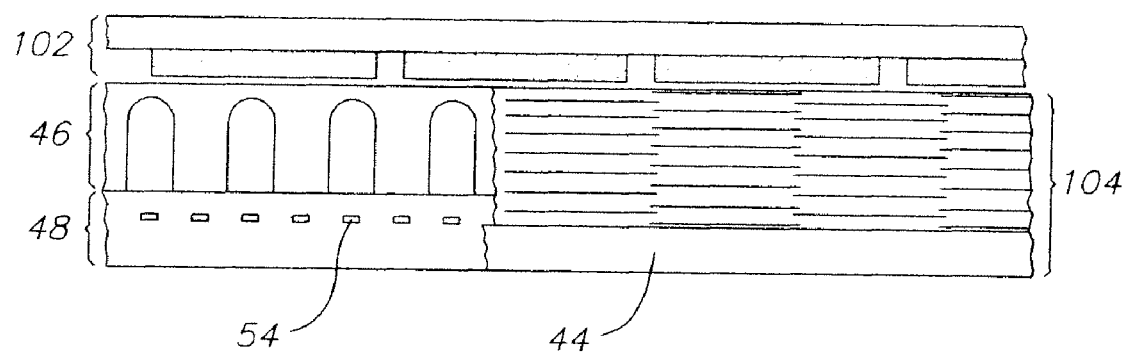
FIG. 13 is a partial cross-sectional view of a linear permanent magnet machine according to one embodiment of the present invention.

As seen in FIG. 11, in one embodiment, this stator construction can apply to conventional rotary electric machine designs where the rotor 94 is internal to the stator 96. As seen in FIG. 12, in another embodiment, this stator construction also can apply to a so-called "inside out" radial machine configuration where the rotor 98 is external to the stator 100. As seen in FIG. 13, according to another embodiment, this stator construction can also apply to so called "linear" configurations, such as where the "rotor" 102 moves along a stator track 104. According to another embodiment, this stator design also can be applied to axial machine configurations. In the following disclosure of a method of manufacturing a stator for an electric machine, one configured for a conventional rotary electric machine design such as that depicted in FIG. 11 is discussed. However, a person having ordinary skill in the art will understand that the structure and method of manufacturing the invention described herein can be applied to any electric machine configuration.

Figure 14:
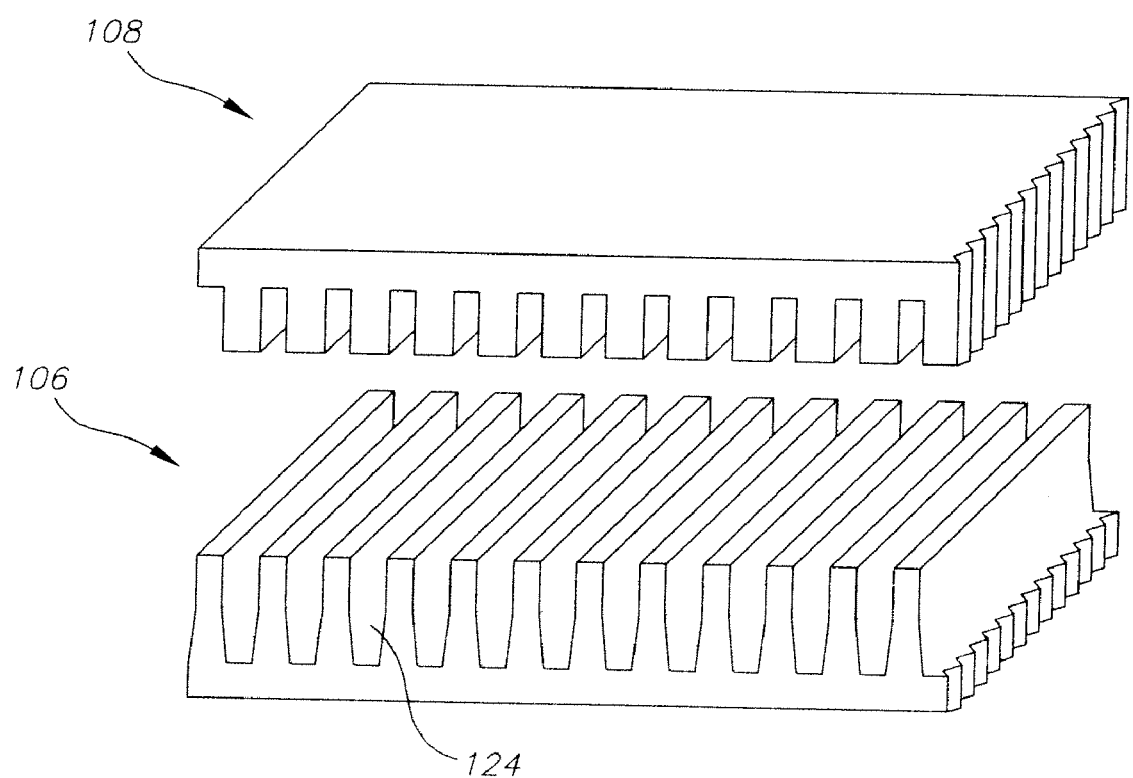
FIG. 14 is a perspective view of a winding jig according to one embodiment of the present invention.

Manufacturing a stator for an electric machine according to one embodiment of the present invention begins with the fabrication of the compacted and bonded winding 42. As seen in FIG. 14, the winding 42 is assembled using a flat winding jig (the "bottom jig") 106. Multiple strands of thermally bondable wire 56 are inserted into the bottom jig 106. Insulation material may added between neighboring strands that will have a large potential difference during operation of the machine. Dimensions of the slots 124 in the bottom jig 106 are such that the completed winding fits accurately within the slots 50 in the active element core 46, with allowance for slot liners 64.

While in the bottom jig 106, the winding 42 is then compressed using a mating jig (the "top jig") 108. Typical compression forces are in the range of 30 to 50 kpsi. When these forces are applied, the cross section of wire strands 56 deforms such that the packing factor in the slots 50 will typically be greater than 95%.

While compression forces remain applied, the wire temperature is raised to the point where the individual strands 56 fuse together. In most cases, it is desirable to prevent or limit fusion of the end turn strands, such that the end turns remain somewhat flexible, enabling the winding 42 to be inserted within the active element core slots 50. After fusion of the compressed regions has taken place, the winding 42 is allowed to cool, the top jig 108 is withdrawn, and finally the winding 42 is extracted from the bottom jig 106.

The active element core 46 may be fabricated by stacking ferromagnetic laminations using conventional "stack and bond" methods. However, in place of bonding, other methods of securing the laminations, such as tig-welding may be used. If stack and bond is used, prior to bonding, the laminations shown in FIG. 6 of the active element core 46 may be etched, such that any surface oxide film is removed, thus improving bond strength. Next, lamination faces 110 may be thinly coated with a thermally activated resin. The coated laminations may then be stacked to form a cylinder, using a fixture (a "stacking jig") to align the laminations. Compressive force may then be applied to the lamination stack and the entire assembly heated in accordance with a defined thermal cycle such that the individual laminations are bonded together.

After cooling, the entire active element core 46 is removed from the stacking jig, and slot liners 64 as shown in FIG. 7 may then be inserted into each of the slots 50. The slot liners 64 may have "windows" 66, or openings, as discussed earlier. In some cases, it may be appropriate for the slot liners 64 to be bonded to the slot walls 72.

In order to reduce leakage flux, the lamination thickness at the bottom of the slot 74 should be fairly thin. Typically, the thickness of this bridge region 74 should not exceed about three times the air gap thickness. In turn, the existence of these thin bridge regions 74 implies that the active element core 46 may lack the rigidity needed for the subsequent steps of fabrication. This problem can be solved by using a precision mandrel that maintains the bore concentricity during subsequent fabrication. The mandrel is then removed after the active element core 46 and cooling element core 48 have been mated. In the case where the bore surface 78 of the completed stator core 40 is machined to expose slot gaps 80, the thickness of the bridge region 74 can start out relatively thick and the mandrel may not be needed.

The compacted and bonded winding 42 is inserted into the active element core 46 using a wrapping motion, such that the active conductor elements progressively engage within the core slots 50, as in FIG. 4. During this process, the end turns bend and distort such that the desired wrapping motion of the active conductor elements can be achieved. The winding 42 is held in place during the remaining steps via localized bondants or adhesives that lock selected parts of the winding 42 to the slot liners 64.

Referring again to FIGS. 8(*a-b*), the cooling element 82 comprises an annular lamination member or cooling element core 48, a front manifold 84 and a rear manifold (not pictured) that fit over the faces of the cooling element core 48, and tie rods 86 that draw the manifolds toward each other, compressing the cooling element core 48. The cooling element core 48 is fabricated from stamped magnetic laminations using essentially the same methods as the active element core 46, described above. The required fluid seal between each manifold and the respective face of the cooling element core 46 is provided by either a gasket or by O-rings 112.

The contiguous cooling ports 54 within the cooling element core 48 are sealed after final assembly by introducing a sealant under pressure within the cooling ports 54. This forces the sealant into any voids between laminations and thereby provides a seal. Excess sealant is then removed by introducing air flow via the manifold inlet and outlet ports 114 and 116. Tension applied to the tie rods 86 maintains integrity of the structure and prevents leaks from forming. The surface 90 of the cooling element core 48 that mates with the active element core 46 is coated with a thin layer of thermally activated, high thermal conductivity epoxy resin which provides a bond between the two elements after they have been mated and temperature cycled.

Figure 8B:
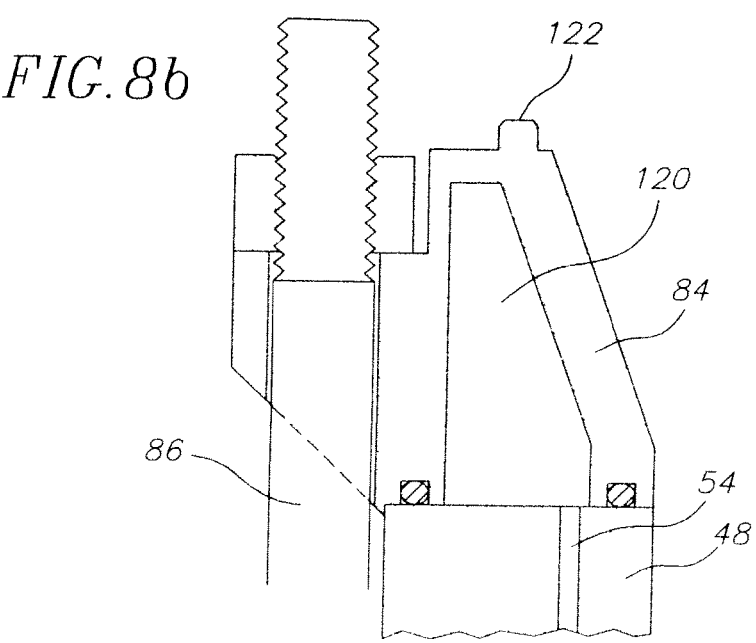
FIG. 8(b) is a cross-sectional view cut along line A-A in FIG. 8(a), showing the tie-rod assembly that holds the front and back manifolds to the core of the stator, as according to one embodiment of the present invention.

Several features can be added to the manifolds, as depicted in FIGS. 8(*a-b*). Inlet and outlet "bibs" 118 can be added to connect to hoses that supply and return coolant. Partitions within the manifold cavities 120 can be added at desired locations to direct and constrain fluid flow. Axial fins or ridges can be added within the manifold cavities 120 to provide increased heat transfer between the flowing coolant and the manifold walls. Axial fins or ridges can be added on the manifold exterior faces to provide enhanced integrity between the potting material and manifolds themselves. A precision circular register 122 can be included within at least one manifold face to provide alignment for end bells which attach.

Referring again to FIG. 3, for rotary electric machine constructions, the active and cooling element cores 46 and 48 fit together concentrically with interference. During mating, the outer member (the cooling element 82 in the case of a conventional rotary motor) is heated such that thermal expansion eliminates the interference, thus allowing unforced assembly. In another embodiment, as shown in FIG. 10, the contacting surfaces 90 of the two elements can be spiral sections 92 such that forced mating is achieved by rotational motion between the two elements. By applying a thin coating of a thermally activated resin to at least one of the mating surfaces 90 or 92, the two elements can be secured together by suitable temperature cycling after assembly.

Molds are then applied over the core 40. A potting resin 68 having high thermal conductivity is then pressure injected within the above combination such that voids between the surfaces of the winding 70, surfaces of the slot liners 64, and surfaces 72 of the slots 50 are filled. Likewise, voids between the end turns and the manifold surfaces are also filled during this step. The potting material 68 is cured by application of a suitable thermal cycle. The end result of this step is that efficient heat transfer is provided between all portions of the winding 42 and the coolant that will flow in the cooling ports 54.

In those cases where slot gaps 80 are required, the bore surface 78 will be machined ("turned") until the appropriate material is removed. Grinding and etching techniques are generally required to remove burrs, which can cause interlamination shorts that can result in increased core losses.

What is claimed is:

1. A stator for an electric machine, the stator comprising windings and a ferromagnetic core, the ferromagnetic core comprising a unitary first core element in contact with a unitary second core element, wherein:

the unitary first core element includes a plurality of slots that are open for insertion of the windings, wherein the slots are between a plurality of teeth;

at least a portion of the windings is compacted and bonded such that a cross section of the compacted and bonded portion of the windings generally matches the shape of at least a portion of the slots;

at least a portion of the compacted and bonded windings is in the slots;

the unitary second core element is in contact with the unitary first core element at a plurality of mating surfaces;

at least a portion of the unitary second core element bridges between the teeth of the unitary first core element to close the open slots;

wherein dielectric liners line the slots; and wherein the dielectric liners comprise windows to allow subsequently added potting material to form low thermal resistance paths between the winding surfaces and the walls of the slots.

2. The stator according to claim 1, wherein the unitary first core element and the unitary second core element comprise a plurality of stacked ferromagnetic laminations that are electrically insulated from one another.

3. The stator according to claim 1, wherein the windings comprise a plurality of strands, and wherein the strands are transposed such that circulating currents in the windings are reduced.

4. The stator according to claim 1, wherein the unitary second core element comprises at least one fluid channel to facilitate the removal of heat from the stator.

5. The stator according to claim 4, wherein manifolds are on opposing faces of the unitary second core element to direct coolant flow through the fluid channel.

6. The stator according to claim 1, wherein the stator is configured for a rotary electric machine design.

7. The stator according to claim 1, wherein thermally activated resin is applied to at least one of the mating surfaces, such that the first unitary core element and the second unitary core element can be secured together by suitable temperature cycling after assembly.

8. The stator according to claim 1, wherein the stator is configured for a linear electric machine design.

9. The stator according to claim 1, wherein the stator is configured for an axial machine design.

10. A stator for an electric machine, the stator comprising windings and a ferromagnetic core, the ferromagnetic core comprising a unitary first core element in contact with a unitary second core element, wherein:

the unitary first core element includes a plurality of slots that are open for insertion of the windings, wherein the slots are between a plurality of teeth;

at least a portion of the windings is compacted and bonded such that a cross section of the compacted and bonded portion of the windings generally matches the shape of at least a portion of the slots;

at least a portion of the compacted and bonded windings is in the slots;

the unitary second core element is in contact with the unitary first core element at a plurality of mating surfaces;

at least a portion of the unitary second core element bridges between the teeth of the unitary first core element to close the open slots;

wherein the stator is configured for a rotary electric machine design; and wherein the mating surfaces are spiral sections such that forced contact between the unitary first core element and the unitary second core element is achieved by rotational motion between the first unitary core element and the second unitary core element.

* * * * *